US010877685B2

(12) United States Patent
Feng et al.

(10) Patent No.: US 10,877,685 B2
(45) Date of Patent: Dec. 29, 2020

(54) METHODS, DEVICES AND COMPUTER PROGRAM PRODUCTS FOR COPYING DATA BETWEEN STORAGE ARRAYS

(71) Applicant: EMC IP Holding Company LLC, Hopkinton, MA (US)

(72) Inventors: Changyu Feng, Beijing (CN); Xinlei Xu, Beijing (CN); Xiongcheng Li, Beijing (CN); Haiying Tang, Beijing (CN); Xiaobo Zhang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/512,639

(22) Filed: Jul. 16, 2019

(65) Prior Publication Data

US 2020/0026430 A1    Jan. 23, 2020

(30) Foreign Application Priority Data

Jul. 20, 2018 (CN) .......................... 2018 1 0802064

(51) Int. Cl.
*G06F 3/06* (2006.01)
*G06F 16/903* (2019.01)

(52) U.S. Cl.
CPC ............ *G06F 3/065* (2013.01); *G06F 3/0607* (2013.01); *G06F 3/0659* (2013.01); *G06F 3/0688* (2013.01); *G06F 16/903* (2019.01)

(58) Field of Classification Search
None
See application file for complete search history.

(56) References Cited

U.S. PATENT DOCUMENTS

| 8,107,467 | B1* | 1/2012 | Madnani | H04L 49/357 370/383 |
| 2005/0283564 | A1* | 12/2005 | Lecrone | G06F 17/30 711/100 |
| 2014/0136811 | A1* | 5/2014 | Fleischer | G06F 15/785 711/207 |

\* cited by examiner

*Primary Examiner* — Charles Rones
*Assistant Examiner* — Hewy H Li
(74) *Attorney, Agent, or Firm* — BainwoodHuang

(57) ABSTRACT

Techniques for copying data involve: in response to receiving a request for copying data in a source address to a destination address, sending a first query and a second query to a first array associated with the source address and a second array associated with the destination address; receiving, from the first array, a first identifier as a response to the first query, the first identifier indicating a first logical storage unit in the first storage array corresponding to the source address; receiving, from the second array, a second identifier as a response to the second query, the second identifier indicating a second logical storage unit in the second array corresponding to the destination address; and triggering, based on the first and second identifiers, an inter-array data copy to perform copying the data. The first and second identifiers are globally unique at least for the storage array being triggered.

22 Claims, 8 Drawing Sheets

METHODS, DEVICES AND COMPUTER PROGRAM PRODUCTS FOR COPYING DATA BETWEEN STORAGE ARRAYS

CROSS-REFERENCE TO RELATED APPLICATION

This application claims priority to Chinese Patent Application No. CN201810802064.1, on file at the China National Intellectual Property Administration (CNIPA), having a filing date of Jul. 20, 2018, and having "METHODS, DEVICES AND COMPUTER PROGRAM PRODUCTS FOR COPYING DATA" as a title, the contents and teachings of which are herein incorporated by reference in their entirety.

FIELD

The present disclosure generally relates to the field of data processing, and more specifically, the present disclosure relates to a method, a device and a computer program product for copying data.

BACKGROUND

With rapid development of information technologies, the amount of data to be stored and processed by users becomes larger and larger. Currently, in addition to increasing a storage density or storage capacity of an individual storage device, a storage array formed by a plurality of storage devices is often utilized to improve the data storage capacity. Typically, a storage array consists of a plurality of independent non-volatile storage devices, for example disks, solid-state disks (SSD) etc. These storage devices are jointly connected to a storage array controller, and perform operations related to data storage under the control of the controller.

At present, a host is often connected to a plurality of different storage arrays, and during the utilization and development process, a user of the host does not concern about a specific physical location of a logical storage unit that a storage array exposes to it. In a conventional scheme, the host may simply initiate a request for copying data in a logical storage unit to a further logical storage unit. When the two logical storage units are located in different storage arrays, how to effectively implement data copy across storage arrays becomes a hot issue.

SUMMARY

Embodiments of the present disclosure provide a solution of inter-storage array data copying.

In accordance with a first aspect of the present disclosure, there is provided a method of copying data. The method includes: in response to receiving a request for copying data in a source address to a destination address, sending a first query and a second query to a first storage array associated with the source address and a second storage array associated with the destination address; receiving, from the first storage array, a first identifier as a response to the first query, the first identifier indicating a first logical storage unit in the first storage array corresponding to the source address; receiving, from the second storage array, a second identifier as a response to the second query, the second identifier indicating a second logical storage unit in the second storage array corresponding to the destination address; and triggering, based on the first and second identifiers, a storage array in the first and second storage arrays supporting inter-data data copy, to perform copying the data, where the first and second identifiers are globally unique at least for the storage array being triggered.

In accordance with a second aspect of the present disclosure, there is provided a method of copying data. The method includes: in response to receiving a command of copying data in a source address to a destination address, obtaining, at a first storage array, a first identifier associated with the source address and a second identifier associated with the destination address; determining a first logical storage unit associated with the first identifier and a second logical storage unit associated with the second identifier, one of the first and second logical units being located in a second storage array outside the first storage array; and copying, based on a SCSI command, the data in the source address of the first logical storage unit to the destination address of the second logical storage unit, where the first and second identifiers are globally unique at least for the first storage array.

In accordance with a third aspect of the present disclosure, there is provided an electronic device. The device includes: at least one processing unit; at least one memory coupled to the at least one processing unit and storing an instruction executed by the at least one processing unit, the instruction, when executed by the at least one processing unit, causing the device to execute acts of: in response to receiving a request for copying data in a source address to a destination address, sending a first query and a second query to a first storage array associated with the source address and a second storage array associated with the destination address; receiving, from the first storage array, a first identifier as a response to the first query, the first identifier indicating a first logical storage unit in the first storage array corresponding to the source address; receiving, from the second storage array, a second identifier as a response to the second query, the second identifier indicating a second logical storage unit in the second storage array corresponding to the destination address; and triggering, based on the first and second identifiers a storage array in the first and second storage arrays supporting inter-array data copy to perform copying the data, where the first and second identifiers are globally unique at least for the storage array being triggered.

In accordance with a fourth aspect of the present disclosure, there is provided an electronic device. The device includes: at least one processing unit; at least one memory coupled to the at least one processing unit and storing an instruction executed by the at least one processing unit, the instruction, when executed by the at least one processing unit, causing the device to execute acts of: in response to receiving a command of copying data in a source address to a destination address, obtaining, at a first storage array, a first identifier associated with the source address and a second identifier associated with the destination address; determining a first logical storage unit associated with the first identifier and a second logical storage unit associated with the second identifier, one of the first and second logical units being located in a second storage array outside the first storage array; and copying, based on a SCSI command, the data in the source address of the first logical storage unit to the destination address of the second logical storage unit, where the first and second identifiers are globally unique at least for the first storage array.

In accordance with a fifth aspect of the present disclosure, there is provided a computer program product. The computer program product is stored on a non-transient computer storage medium and includes a machine executable instruction, and the machine executable instruction, when operating in a device, causes the device execute the method of the first aspect of the present disclosure.

In accordance with a sixth aspect of the present disclosure, there is provided a computer program product. The computer program product is stored on a non-transient computer storage medium and includes a machine executable instruction, and the machine executable instruction, when operating in a device, causes the device execute the method of the second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the present disclosure.

BRIEF DESCRIPTION OF THE DRAWINGS

The above and other objectives, features, and advantages of example embodiments of the present disclosure will become more apparent through more detailed description of the example embodiments of the present disclosure with reference to the accompanying drawings, in which the same reference symbols generally represent the same components.

DETAILED DESCRIPTION OF EMBODIMENTS

Figure 1:
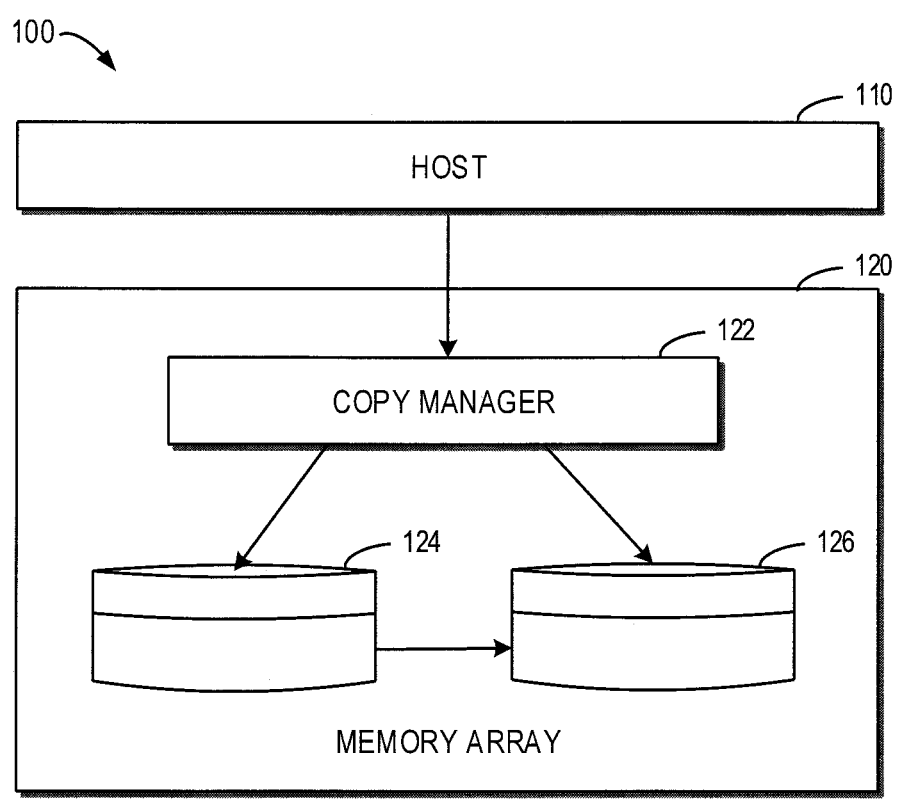
FIG. 1 illustrates a schematic diagram of existing intra-storage array data copy.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments of the present disclosure will be described in more details with reference to the drawings. Although the preferred embodiments of the present disclosure are illustrated in the drawings, it should be understood that the present disclosure may be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one another embodiment." The terms "first", "second" and so on can refer to same or different objects. The following text can also include other explicit and implicit definitions.

As described above, dedicated processing resources may be provided locally at a client or by a remote machine or system. In some examples, a cloud-based computing system can be deployed, which includes a plurality of machines having one or more dedicated processing resources. The dedicated processing resources of the computing system can be utilized by different clients in accordance with needs, to schedule a corresponding application on available dedicated processing resources for operation.

In the case that two logical storage units are located in the same storage array, FIG. 1 illustrates a diagram 100 of existing intra-storage array data transmission. As shown in FIG. 1, a host 110 is connected to a storage array 120 which includes a copy manager 122, and a plurality of logical storage units 124 and 126. When the host 110 requests for copying data of the source address in the logical storage unit 124 to the destination address of the logical storage unit 120, the host 110 may simply send a copy command to the copy manager 122. The copy manager 122 may determine the logical storage unit 124 corresponding to the source address and the logical storage unit 126 corresponding to the destination address, respectively. Thereafter, the copy manager 122 may send a read command to the logical storage unit 124 and a write command to the logical storage unit 126, thereby implementing a data copy from the logical storage unit 124 to the logical storage unit 126.

For the solution of intra-array data copy as shown in FIG. 1, the host 110 is only required to send a data copy command, rather than performing data read and data write. For example, for an extended copy command in an existing small computer system interface (SCSI) command set, a data copy mechanism as shown in FIG. 1 is employed. However, the extended copy command in the SCSI command set only supports data copy within a storage array, which cannot implement inter-storage array data copy.

Figure 2:
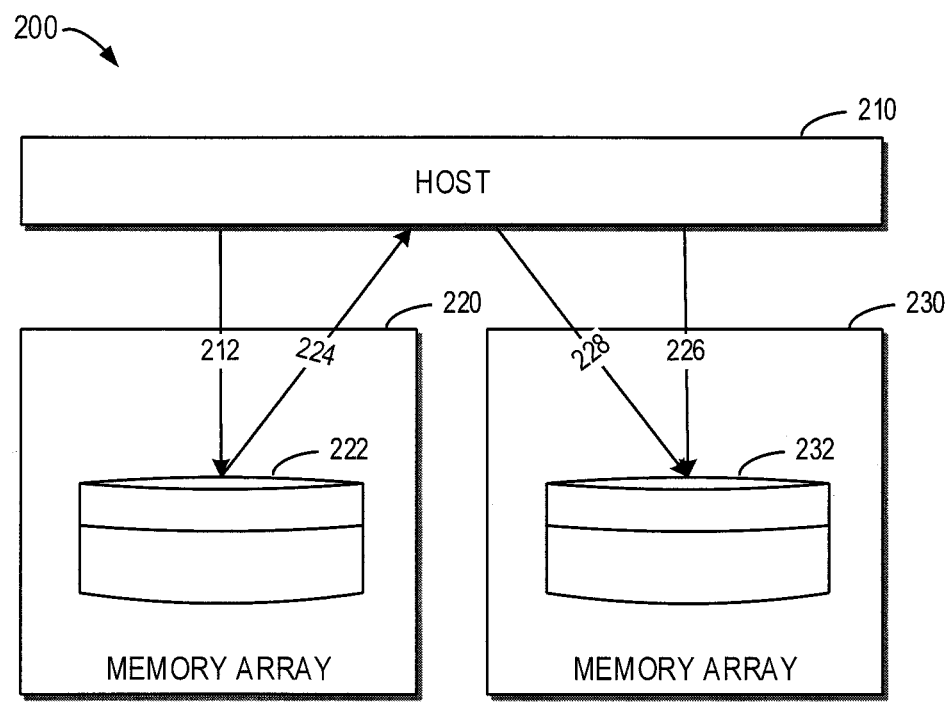
FIG. 2 illustrates a schematic diagram of existing inter-storage array data copy.

FIG. 2 illustrates a diagram 200 of the existing inter-storage array data copy. As shown in FIG. 2, a host 210 is connected to a plurality of different storage arrays 220 and 230. When the host 210 requests for copying data in the logical storage unit 222 of the storage array 220 to the logical storage unit 232 of the storage array 230, the host 210 first sends 212 a data read command to a storage array 220, so as to read the data in the source address in the storage array 222; the storage array 220 then sends 224 the data to the host 210; thereafter, the host 210 sends 226 a data write command for the logical storage unit 232 to the storage array 230; and finally, the host 210 writes 228 the data to the logical storage unit 232.

It can be seen that, in the existing inter-storage array data copy solution, first, the host 210 is required to perform data read and data write operations, which consumes a great amount of CPU resources of the host. Second, the host 210 is also required to perform data transmission, and thus, there is a need of providing an extra storage area at the host 210 so as to buffer the data needs to be copied, which will consume a great amount of storage resources of the host. In addition, a large amount of bandwidth of the network is occupied during performing data transmission between the host 210 and the storage arrays 220 and 230.

According to embodiments of the present disclosure, there is provided a solution for copying data. In the solution, when a data copy command is generated, the host will obtain an identifier of the logical unit associated with the source address and the destination address related to copying, and the identifier enables the storage array for executing data copy to uniquely identify the corresponding logical storage unit. When executing data copy, the host is only required to send the data copy command including the foregoing identifier to the storage array that supports performing of inter-storage array data copy, without a need of performing data transmission, thereby significantly reducing the resource consumption of the host, such as CPU consumption, storage consumption, bandwidth consumption and the like.

Figure 3:
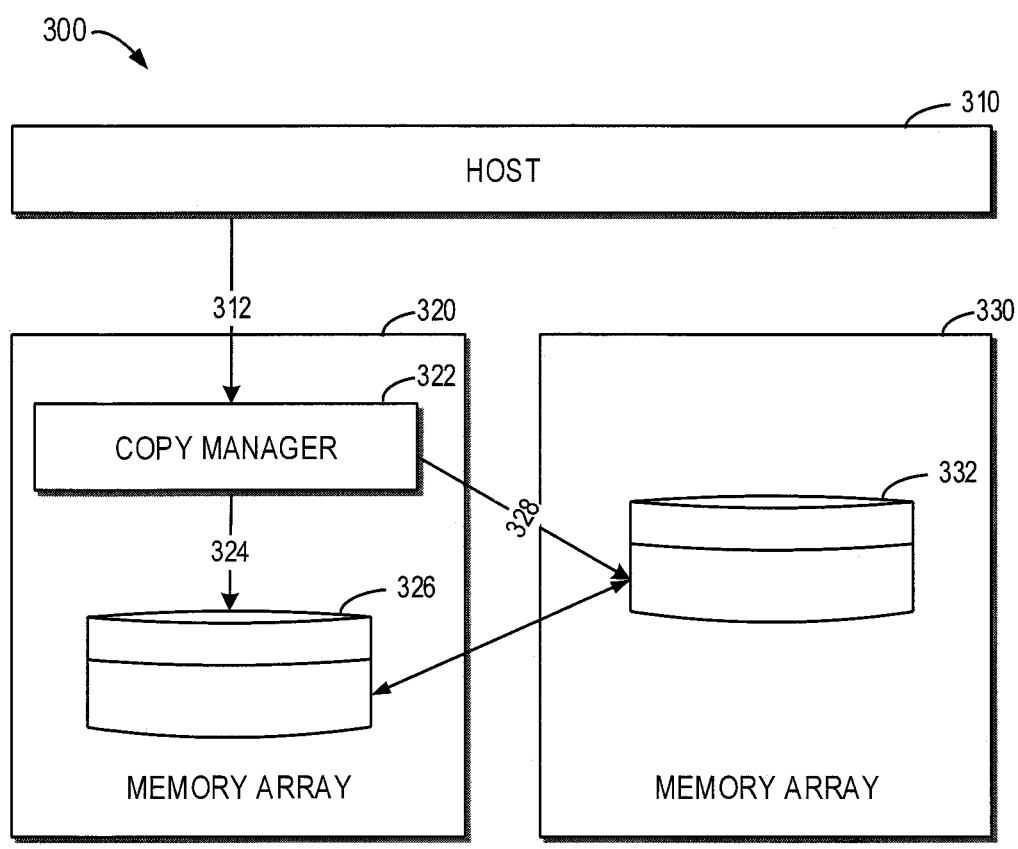
FIG. 3 illustrates a diagram of inter-storage array data copy according to embodiments of the present disclosure.

FIG. 3 illustrates a diagram 300 of inter-storage array data copy according to embodiments of the present disclosure. As shown in FIG. 3, a host 310 is connected to a plurality of different storage arrays 320 and 330. The host 310 generates a data copy command and sends 312 the command to the storage array 320, where the data copy command includes an identifier associated with the logical storage unit needs to be accessed (read/write), which can uniquely identify for the storage array 320 the logical storage unit needs to be accessed. The procedure of generating and sending the data copy command by the host 310 will be described below in detail with reference to FIG. 4.

Figure 4:
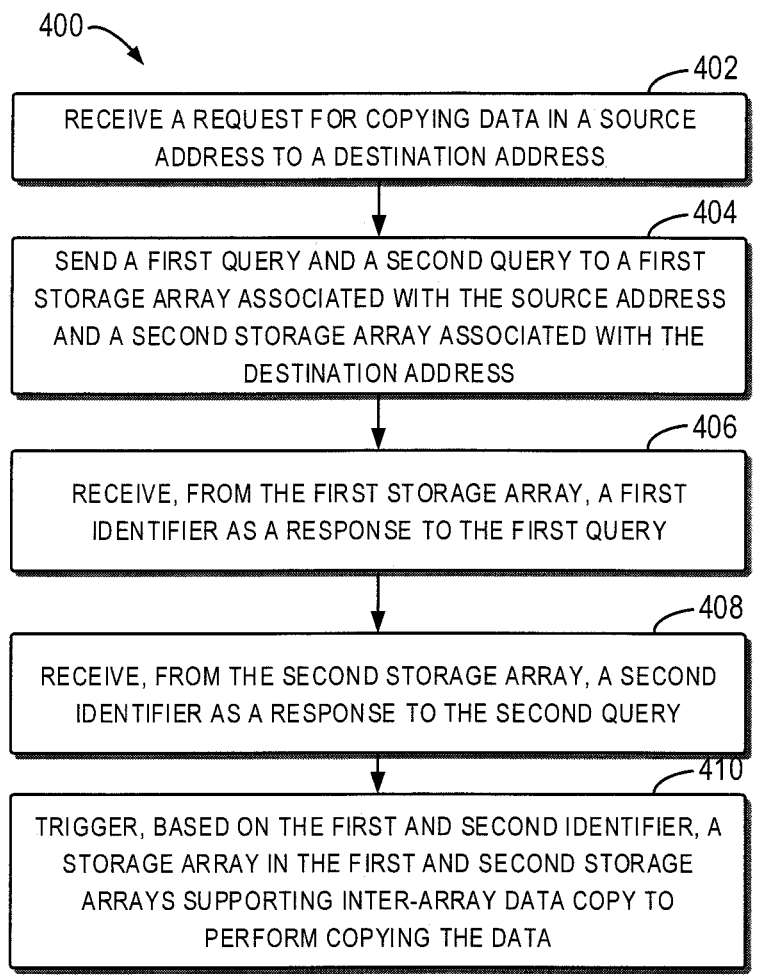
FIG. 4 illustrates a flowchart of a method of inter-storage array data copy according to embodiments of the present disclosure.

FIG. 4 illustrates a procedure 400 of generating and sending a data copy command according to the embodiments of the present disclosure. As shown in FIG. 4, at block 402, the host 310 receives a request of copying the data of the source address to the destination address. In some embodiments, the host 310 may receive a data copy request in response to a user's operation. In some other embodiments, the host 310 may receive the data copy request in response to a system call (for example, a data backup service) at the backend.

At block 404, the host 310 sends a first query and a second query to a first storage array associated with the source address and a second storage array associated with the destination address. For convenience of description, the storage array 320 is taken as an example of the first storage array associated with the source address, and the storage array 330 is taken as an example of the second storage array associated with the destination address. In some embodiments, based on the above request, the host 310 determines the storage array 320 associated with the source address, and then determines the storage array 330 associated with the destination address. It would be appreciated that the above description is provided merely as an example, the external storage array 330 may also be the first storage array associated with the source address.

The host 310 may send the first and second queries to the storage array 320 and the storage array 330, respectively. In some embodiments, the host 310 may send a query request for vital product data (VPD) to the storage array 320 and the storage array 330, in which the VPD refer to a series of configuration and identification information related to the device that the SCSI device can provide.

At block 406, the host 310 receives from the first storage array 320 a first identifier as a response to the first query, where the first identifier indicates the first logical storage unit 326 in the first storage array corresponding to the source address; and at block 408, the host 310 receives from the second storage array 330 a second identifier as a response to the second query, where the second identifier indicates the second logical storage unit 332 corresponding to the destination address in the second storage array.

In some embodiments, the host 310 may also determine whether the first storage array 320 and the second storage array 330 support performing of inter-array data copy. In some embodiments, the host 310 may check configuration files of the storage arrays to determine whether the storage array 320 and the storage array 330 support performing of the inter-array data copy. The host 310 may select a storage array supporting inter-array data copy as an executor of data copy. When only one of them supports performing of inter-array data copy, the host 310 selects this storage array as the executor of data copy; and when both of them support performing of inter-array data copy, the host 310 may select one of them as the executor of data copy, for example the storage array related to the source address. By way of example as illustrated in FIG. 3, the host 310 selects the first storage array 310 as the executor of the inter-array data copy.

In some embodiments, the host 310 may receive two types of identifiers from the first storage array 310 and the second storage array 330. Taking the first storage array 320 as an example, the first type of identifier is a worldwide unique name of the logical storage unit 326 (for example, an address authorization identifier NAA, a 64-bit EUI or a SCSI name, and the like), which can globally, uniquely identify the logical storage unit 326; and the second type of identifier is a logical unit number of the logical storage unit 326, which is the logical unit number of the logical storage unit 326 within the storage array 320, which can uniquely identify the logical storage unit 326 within the storage array 320. For example, based on a VPD query command, the host 310 may obtain that the address authentication identifier NAA of the logical storage unit 326 is "[0X600601605b1034008af9945a26587bbd]", which can globally, uniquely identify the first logical storage unit 326, and the host 310 may obtain that the logical unit number of the first logical storage unit 326 is "[00 01 00 00 00 00 00 00 00 12 00 00 00 00 00 00]", which can uniquely identify the logical storage unit 326 within the storage array 320.

In order to uniquely identify a respective logical storage unit, the first and second identifiers are globally unique at least for the storage array executing the inter-array copy, and in the example of FIG. 3, the first and second identifiers are globally unique for the first storage array 320. In some embodiments, for the logical storage unit 326 executing the inter-array data copy in the first storage array 320, the host 310 may determine the logical unit number of the logical storage unit 326 as the first identifier; and for the logical storage unit 332 not executing the inter-array data copy in the second storage array 330, the host 310 may determine the worldwide unique name of the logical storage unit 332 as the second identifier. In this case, the first identifier (the logical unit number) of the first logical storage unit 326 and the second identifier (the worldwide unique name) of the second logical storage unit 332 are globally unique for the first storage array 320, and can uniquely identify the corresponding logical storage unit.

In some embodiments, the host 310 may select the worldwide unique name WWN of the first logical storage unit 326 and the worldwide unique name WWN of the second logical storage unit 332 as the first and second identifiers, respectively. Such identifiers are globally unique for the first storage array 320, and can uniquely identify the respective logical units.

The first and second identifiers enable the first storage array 320 to uniquely locate the logical storage units 326 and 332 associated with a data copy command, such that the first storage array 320 can support independent performing of data copy from the internal logical storage unit 326 to the external storage unit 332, without a need of consuming additional resources in the host 310 any longer, thereby greatly improving the efficiency of inter-storage array data copy.

At block 410, based on the first and second identifiers, the host 310 triggers the storage array supporting performing of array data copy in the first and second storage arrays to perform data copy, where the first and second identifiers are globally unique at least for the triggered storage array. Continuing with the example of FIG. 3, based on the first and second identifiers as described above, the host 310 generates a data copy command including the information of the first and second identifiers, and sends the data copy command to the first storage array 320 to trigger the first storage array 320 to perform data copy.

Further referring to FIG. 3, as shown therein, the storage array 320 executing the data copy command is provided with a copy manager 322 which is configured to parse the data copy command received from the host, and to determine the logical storage units associated with the source address and the destination address. For example, the copy manager 332 may determine the first logical storage unit 326 associated with the source address and the second logical storage unit 332 associated with the destination address. As shown in FIG. 3, the second logical storage unit 332 is located in the second storage array 330 outside the first storage array 320 executing the data copy. After the determination of the logical storage unit has been completed, the copy manager 322 may send 324 a read command to the first logical storage unit 326, and send 328 a write command to the logical storage unit 332, so as to implement inter-array copy of data. It would be appreciated that the above description is merely provided as an example, the copy manager 322 may also send a read command to the logical storage unit 332 and send a write command to the logical storage unit 326, so as to implement data copy from the external logical storage unit 332 to the internal logical storage unit 326.

Figure 5:
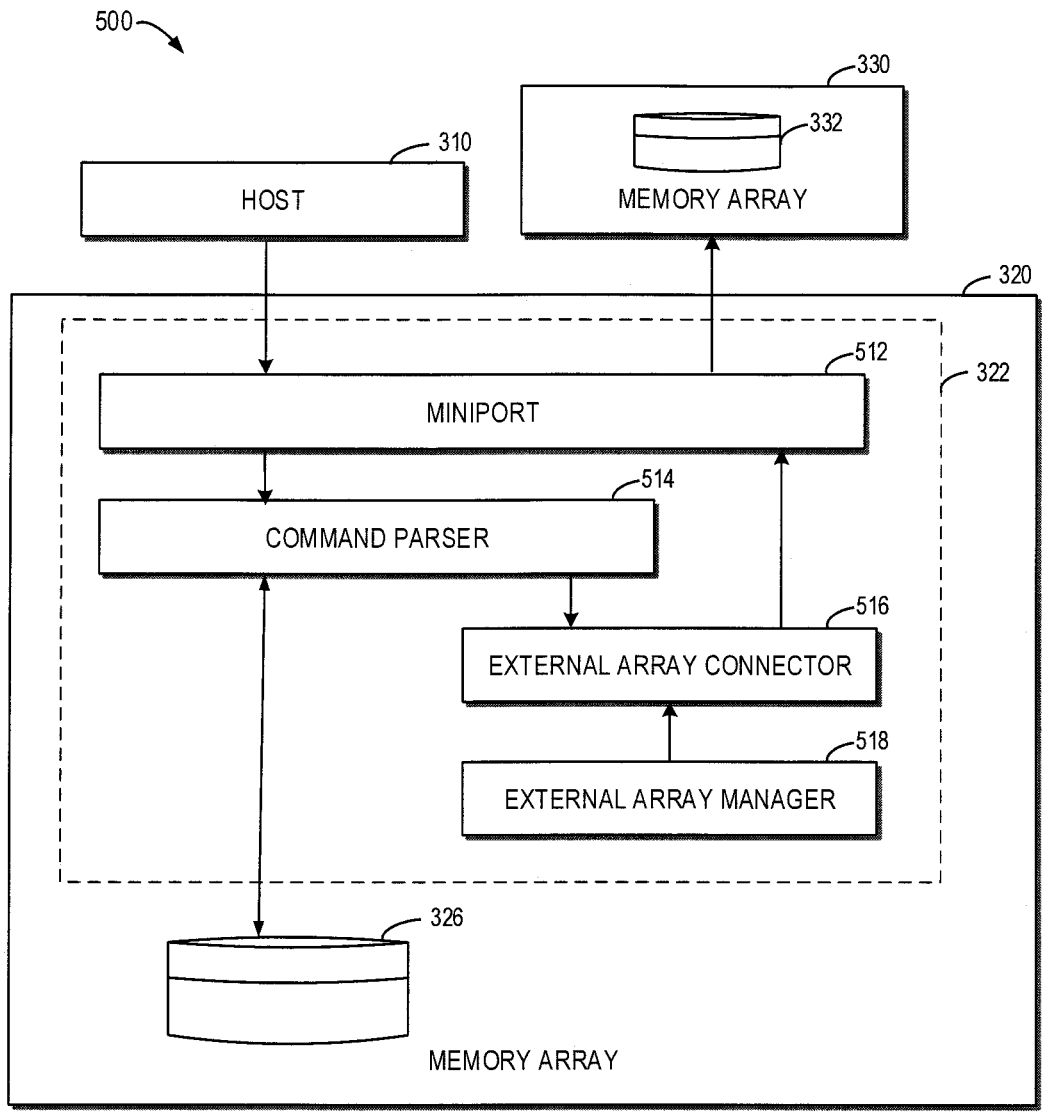
FIG. 5 illustrates an architecture diagram of inter-storage array data copy according to embodiments of the present disclosure.

With reference to FIGS. 5-8, the procedure of inter-storage array data copy will be described below from the storage array side. FIG. 5 further illustrates an architecture diagram 500 of an inter-storage array data copy system according to the embodiments of the present disclosure, and as shown in FIG. 5, the copy manager 332 includes a miniport 512, a command parser 514, an external array connector 516 and an external array manager 518. The miniport 512 is configured to couple to the host 310 and the external storage array 330 respectively, and the specific implementation thereof may depend on the form of coupling with the host 310 and the external storage array 330 respectively. In some embodiments, when the internet small computer system interface (iSCSI) is used to couple to the host 310 and the storage array 330 respectively, the miniport 512 may be implemented as an iSCSI driving layer. In some other embodiments, when using a fiber channel (FC) to couple to the host 310 and the storage array 330 respectively, the miniport 512 may be implemented as a FC driving layer.

The command parser 514 is configured to perform semantic analysis for the copy command received from the host 310, and to convert the copy command into an internal I/O data packet. An I/O data packet directed to the internal logical storage unit 326 is directly sent to a controller of the logical storage unit 326, while an I/O data packet directed to the external logical storage unit 332 is sent to the external array connector 516.

The external array connector 516 is configured to establish a connection with the external storage array 330, and to convert the internal I/O data packet into a standard SCSI command directed to the external storage logical unit 332. For example, when connecting with the external storage array 330 using the iSCSI, the external array connector 516 may establish a connection with the storage array 330 using login information of the storage array 330 stored in the external array manager 518. In some embodiments, the external array manager 518 stores preconfigured login information of the external storage array 330. In some embodiments, when coupling to the external storage array 330 with the FC, the external array connector 516 may directly log into the external storage array 330, without requiring extra login information, and the external array manager 518 may be omitted, in this case.

Figure 6:
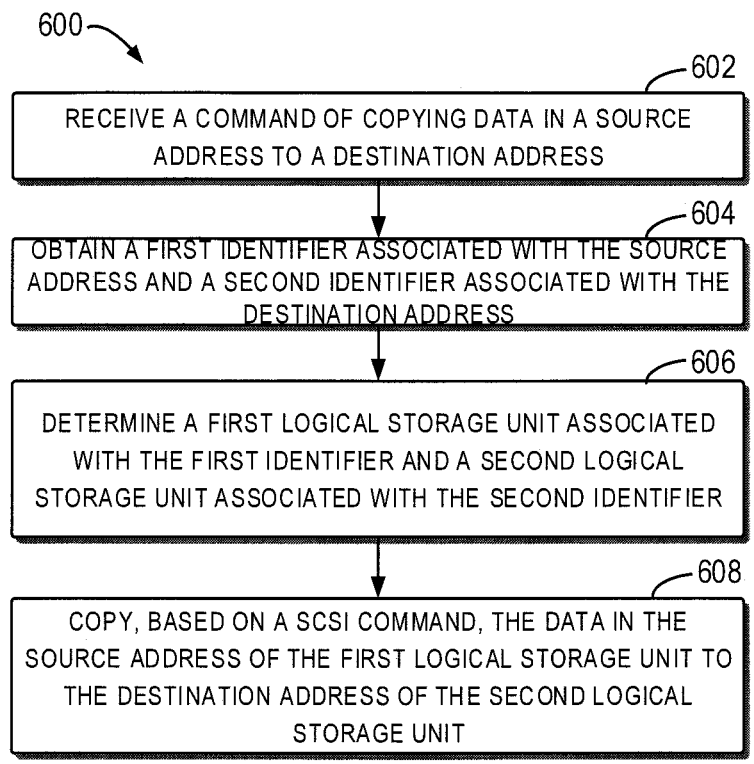
FIG. 6 illustrates a flowchart of a method of inter-storage array data copy according to some other embodiments of the present disclosure.

FIG. 6 illustrates a flowchart of a method 600 of inter-storage array data copy according to some other embodiments of the present disclosure, and the method may be performed by the first storage array 320 in FIG. 5.

At block 602, the first storage array 320 receives a command of copying data in the source address to the destination address; at block 604, the first storage array 320 obtains the first identifier associated with the source address and the second identifier associated with the destination address. As discussed above, the copy command sent by the host 310 to the first storage array 321 includes the first and second identifiers, and the first and second identifiers are globally unique for the first storage array 320, which can uniquely identify the corresponding storage logical unit.

At block 606, the first storage array 320 determines the first logical storage unit associated with the first identifier and the second logical storage unit associated with the second identifier, where one of the first and second logical storage units is located in the second storage array 330 outside the first storage array. Continuing with the example in FIG. 3, the internal storage logical unit 326 is taken as an example of the first storage logical unit, and the external storage logical unit 332 is taken as an example of the second storage logical unit. As described above, the first identifier may be a worldwide unique name WWN or logical unit number of the logical storage unit 326; as such the first storage array 320 can uniquely determine the internal logical storage unit 326 based on the first identifier. The second identifier may be a worldwide unique name of the logical storage unit 332, thus the first storage array 320 can uniquely determine the external logical storage unit 332 based on the second identifier. The method 700 of determining the external logical storage unit 332 based on the second identifier according to the embodiments of the present disclosure will be described below with reference to FIG. 7.

Figure 7:
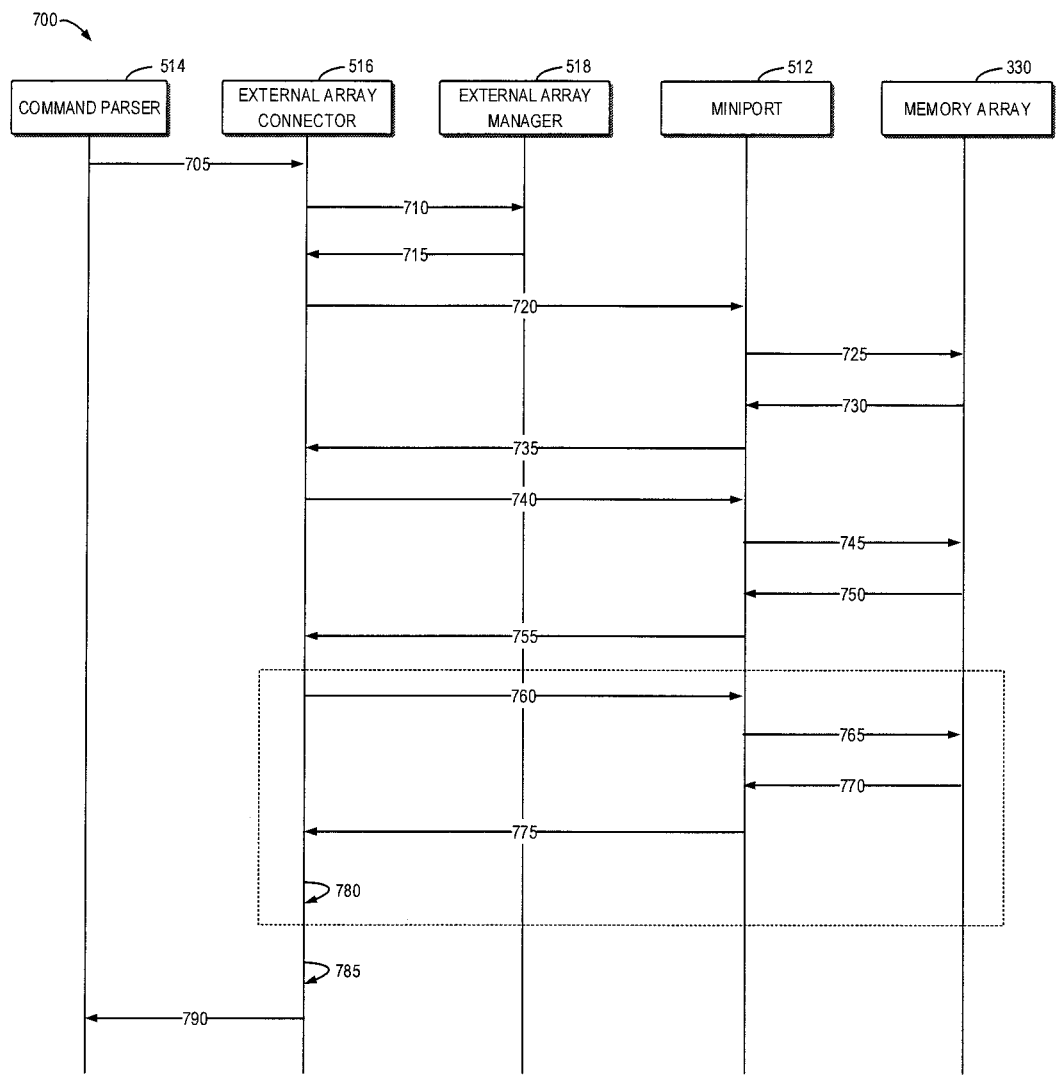
FIG. 7 illustrates a flowchart of a method of determining logical storage units associated with a first identifier and a second identifier according to embodiments of the present disclosure.

As shown in FIG. 7, taking the iSCSI connection as an example, the command parser 514 may send 705 the obtained second identifier to the external array connector; and then, the external array connector 516 may send 710 a query command to the external array manager 518, so as to obtain login information related to the second storage array 330 associated with the second identifier.

Subsequently, the external array manager 518 may send 715 the login information to the external array connector 516; then the external array connector 516 may send 720 a login request of the second storage array 330 to the miniport 512; and upon receiving the login request, the miniport 512 may log 725 into the second storage array 330.

After login succeeds, the second storage array 330 may return 730 login success information; the miniport 512 then may forward 735 the login success information to the external array connector 516. It would be appreciated that, in some embodiments, when the FC connection is used, the external array connector 516 does not need to obtain the login information from the external array manager 518, and in this case, steps 710, 715, 720 and 735 may be omitted.

Thereafter, the external array connector 516 may send 740 a logical storage unit query request to the miniport 512; then the miniport 512 may send 745 the logical storage unit query request to the second storage array 330; in response to the query request, the storage array 330 may send 750 a logical storage unit list to the miniport 512; and next, the miniport 512 may forward 755 the logical storage unit list to the external array connector 516.

After forwarding of the logical storage unit list is completed, the external array connector 516 may send 760 an information query request of an individual logical storage unit to the miniport 512; the miniport 512 may forward 765 the information query request of the individual logical storage unit to the second storage array 330; and in response to the information query request, the second storage array 330 may return 770 the queried information of the logical storage unit, which may include the worldwide unique name and the logical unit number of the logical storage unit.

Then, the miniport 512 may forward 775 the information to the external array connector 516; the external array connector 518 may compare 780 the second identifier received from the command parser 514 with the information of the logical storage unit received from the miniport 512, to determine whether the returned worldwide unique name of the logical storage unit matches the second identifier. If match, the method 700 moves to 785; and if not match, the method is returned to 760, and the information query request of the next logical storage unit is further sent. In some embodiments, sending 760, forwarding 765, returning 770, forwarding 775 and comparing 780 may be repeated among the external array connector 516, the miniport 512 and the second storage array 330, until a second logical storage unit 332 matching the second identifier is obtained.

After finding out the second logical storage unit 332 matching the second identifier, the external array connector 516 may create 785, based on the login information and the logical unit number of the second logical storage unit, an internal access object which can convert the internal I/O data packet into a standard SCSI command for the second logical storage unit 332; and then the external array connector 516 may send 790 the internal access object to the command parser 514, such that the command parser can directly operate on the internal access object to implement read and write for the second logical unit 332.

Continuing to refer to FIG. 6, at block 608, the first storage array 320 copies data in the source address of the first logical storage unit 326 to the destination address of the second logical storage unit 332, based on a SCSI command, in which the first and second identifiers are globally unique at least for the first storage array 320.

The method of copying data in a source address to a destination address according to the embodiments of the present disclosure will be described below with reference to FIG. 8. As shown, the logical storage unit 326 continues acting as an example of the first logical storage unit, and the second logical storage unit 332 acts as an example of the second logical storage unit.

First, the command parser 514 may parse 805 the received data copy command as an internal I/O data packet; subsequently, the command parser 514 may send 810 a read request data packet to the first logical storage unit 326; and the first logical storage unit 326 may send 815 the data in the source address to the command parser 514.

Thereafter, the command parser 514 may send 820 a write request data packet for the second logical storage unit 332 to the external array connector 516; the external array connector 516 converts 825 the write request data packet into a SCSI write command for the second logical storage unit 332; and then, the external array connector 516 may send 830 the SCSI write command to the miniport 512.

Next, the miniport may forward 835 the SCSI write command to the second storage array 330; the parser 514 may send 840 the data to be written to the second storage array 330; and then, the second storage array 330 may perform 845 data write for the destination address of the second logical storage unit 332.

After the data write is completed, the storage array 330 may send 850 SCSI write completing signal to the miniport 512; the miniport 512 may send 855 the SCSI write completing signal to the external array connector 516; then, the external array connector 516 may send 860 the write completing signal to the command parser 514; and the command parser 514 completes 865 the data copy command.

Figure 8:
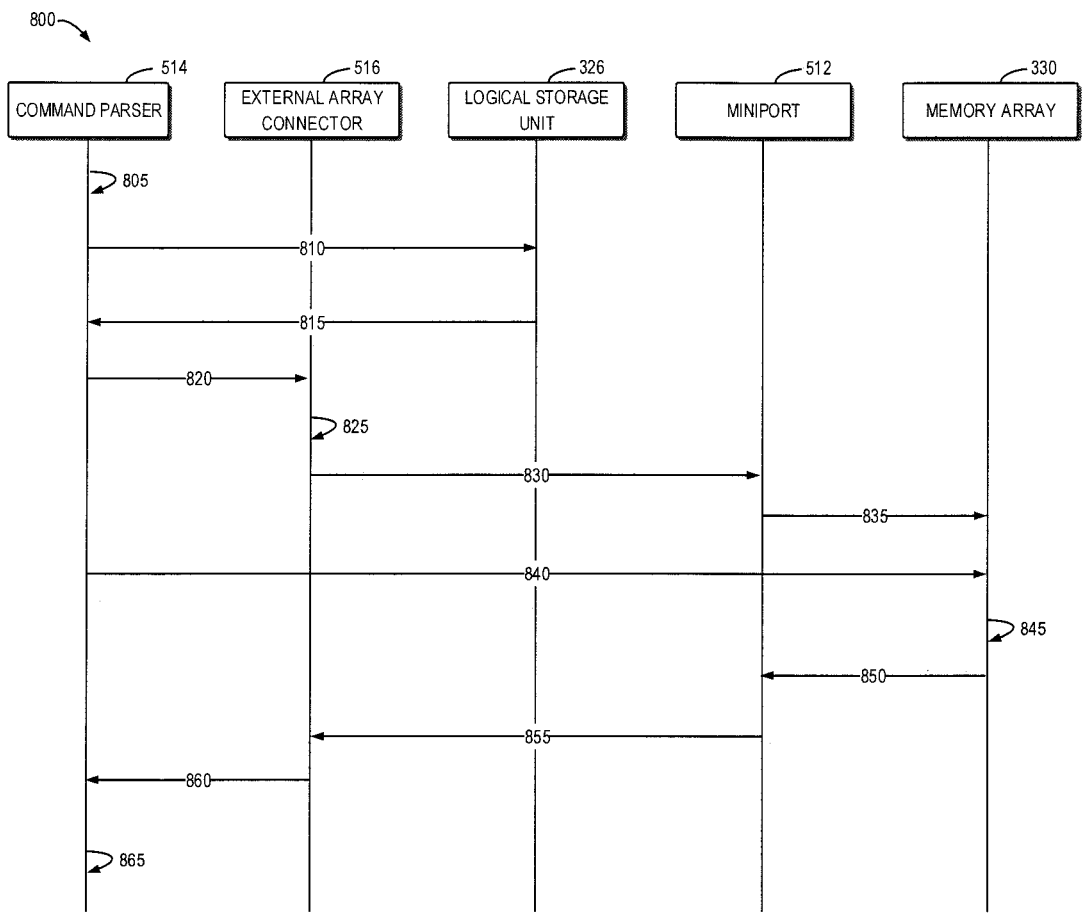
FIG. 8 illustrates a flowchart of a method of copying data in a source address to a destination address according to embodiments of the present disclosure.

It would be appreciated that FIG. 8 is only provided as an example, when the logical storage unit 332 of the storage array 330 is a write object of the copy data, the performing procedure is similar to the one presented in FIG. 8, specifically as follows: the first storage array may read data in the source address from the first logical storage unit 326; and then, through the SCSI command, the data is written into the destination address of the second logical storage unit 332.

Based on the above inter-storage array data copy solution, the host 310 may only perform data generation and sending, without a need of reading and writing data. Comparing with the existing solution, the data copy solution of the present disclosure can remarkably reduce resource consumption of CPU at the host end, the resource consumption of storage and bandwidth occupation. Meanwhile, the data copy solution in the present disclosure can also enable a user to implement efficient inter-storage array data copy by simply inputting a source address and a destination address, thereby greatly saving development and utilization costs. In addition, the data copy solution of the present application can implement direct data copy among different storage arrays, and this data copy procedure does not require data transmission via a host, thereby significantly improving efficiency of data copy.

Figure 9:
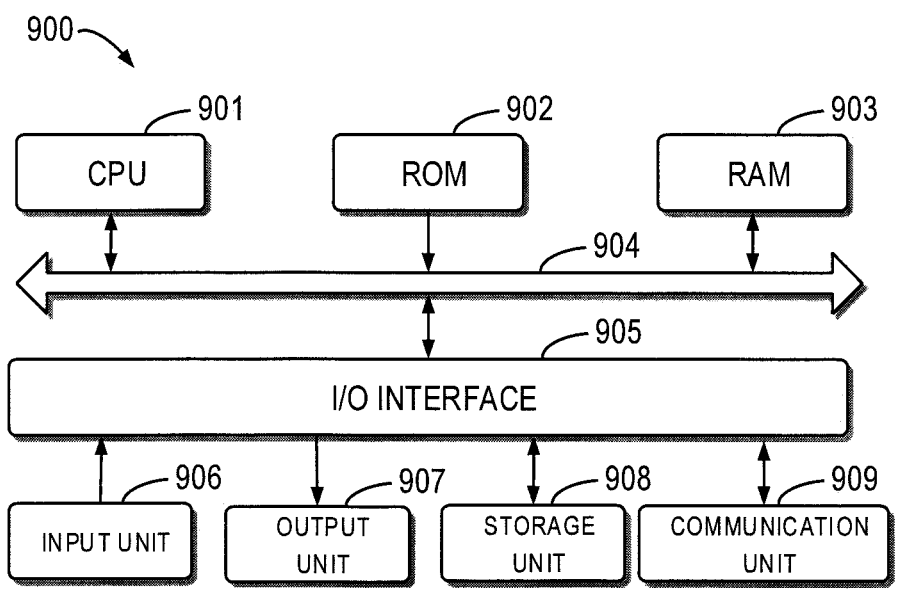
FIG. 9 illustrates a schematic block diagram of an example device for implementing the contents of the present disclosure.

FIG. 9 is a schematic block diagram of an example device 900 for implementing embodiments of the present disclosure. For example, the host 310 and the copy manager 322 as shown in FIG. 3 may be implemented using the example device 900. As shown therein, the device 900 includes a central processing unit (CPU) 901 which performs various appropriate acts and processing, based on computer program instructions stored in a read-only memory (ROM) 902 or computer program instructions loaded from a storage unit 908 to a random access memory (RAM) 903. The RAM 903 stores therein various programs and data required for operations of the device 900. The CPU 901, the ROM 902 and the RAM 903 are connected via a bus 904 with one another. An input/output (I/O) interface 905 is also connected to the bus 904.

The following components in the device 900 are connected to the I/O interface 905: an input unit 906 such as a keyboard, a mouse and the like; an output unit 907 including various kinds of displays and a loudspeaker, etc.; a storage unit 908 including a magnetic disk, an optical disk, and etc.; a communication unit 909 including a network card, a modem, and a wireless communication transceiver, etc. The communication unit 909 allows the device 900 to exchange information/data with other apparatus through a computer network such as Internet and/or various kinds of telecommunications networks.

Various processes and processing described above, e.g., the method 400, the method 600, the method 700 and/or the method 800, may be executed by the processing unit 901. For example, in some embodiments, the method 400, the method 600, the method 700 and/or the method 800 may be implemented as a computer software program that is tangibly included in a machine readable medium, e.g., the storage unit 908. In some embodiments, part or all of the computer programs may be loaded and/or mounted onto the device 900 via the ROM 902 and/or communication unit 909. When the computer program is loaded to the RAM 903 and executed by the CPU 901, one or more steps of the method 400, the method 600, the method 700 and/or the method 800 as described above may be executed.

The present disclosure may be a method, a device, a system, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which includes one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of copying data, comprising:
   in response to receiving a request for copying data in a source address to a destination address, sending a first query and a second query to a first storage array associated with the source address and a second storage array associated with the destination address;
   receiving, from the first storage array, a first identifier as a response to the first query, the first identifier indicating a first logical storage unit in the first storage array corresponding to the source address;
   receiving, from the second storage array, a second identifier as a response to the second query, the second identifier indicating a second logical storage unit in the second storage array corresponding to the destination address; and
   triggering, based on the first and second identifiers, a storage array in the first and second storage arrays supporting inter-array data copy to perform copying the data,
   the first and second identifiers being globally unique at least for the storage array being triggered.

2. The method of claim 1, wherein at least one of the first and second identifiers is a worldwide unique name (WWN).

3. The method of claim 1, wherein at least one of the first and second identifiers is a logical unit number of a logical storage unit in a corresponding storage array.

4. The method of claim 1, wherein the triggering comprises:
   determining whether the first and second storage arrays support the inter-array data copy.

5. A method of copying data, comprising:
   in response to receiving a command of copying data in a source address to a destination address, obtaining, at a first storage array, a first identifier associated with the source address and a second identifier associated with the destination address;
   determining a first logical storage unit associated with the first identifier and a second logical storage unit associated with the second identifier, one of the first and second logical units being located in a second storage array outside the first storage array; and
   copying, based on a small computer system interface (SCSI) command, the data in the source address of the first logical storage unit to the destination address of the second logical storage unit,
   the first and second identifiers being globally unique at least for the first storage array.

6. The method of claim 5, wherein the first logical storage unit is located in the second storage array, wherein determining the first logical storage unit associated with the first identifier comprises:
   querying a logical storage unit list of at least one external storage array associated with the first storage array;
   obtaining identifiers associated with logical storage units in the logical storage unit list; and
   determining, from the logical storage list, the first logical storage unit associated with the first identifier.

7. The method of claim 6, wherein copying the data in the source address to the destination address comprises:
   reading, through a SCSI command, the data in the source address from the first logical storage unit; and
   writing the data into the destination address in the second logical storage unit.

8. The method of claim 5, wherein the second logical storage unit is located in the second storage array, wherein determining the second logical storage unit associated with the second identifier comprises:
   querying a logical storage unit list of at least one external storage array associated with the first storage array;
   obtaining identifiers associated with logical storage units in the logical storage unit list; and
   determining, from the logical storage unit list, the second logical storage unit associated with the second identifier.

9. The method of claim 8, wherein copying data in the source address to the destination address comprises:
   reading the data in the source address from the first logical storage unit; and
   writing, through a SCSI command, the data into the destination address in the second logical storage unit.

10. The method of claim 5, further comprising:
    establishing, based on preconfigured login information, a connection with the second storage array.

11. An electronic device, comprising:
    at least one processing unit;
    at least one memory coupled to the at least one processing unit and storing an instruction executed by the at least one processing unit, the instruction, when executed by the at least one processing unit, causing the device to execute acts of:

in response to receiving a request for copying data in a source address to a destination address, sending a first query and a second query to a first storage array associated with the source address and a second storage array associated with the destination address;

receiving, from the first storage array, a first identifier as a response to the first query, the first identifier indicating a first logical storage unit in the first storage array corresponding to the source address;

receiving, from the second storage array, a second identifier as a response to the second query, the second identifier indicating a second logical storage unit in the second storage array corresponding to the destination address; and triggering, based on the first and second identifiers, a storage array in the first and second storage arrays supporting inter-array data copy to perform copying the data, the first and second identifiers being globally unique at least for the storage array being triggered.

12. The device of claim 11, wherein at least one of the first and second identifiers is a worldwide unique name (WWN).

13. The device of claim 11, wherein at least one of the first and second identifiers is a logical unit number of a logical storage unit in a corresponding storage array.

14. The device of claim 11, wherein the triggering comprises:
determining whether the first and second storage arrays support the inter-array data copy.

15. An electronic device, comprising:
at least one processing unit;
at least one memory coupled to the at least one processing unit and storing an instruction executed by the at least one processing unit, the instruction, when executed by the at least one processing unit, causing the device to execute acts of:
in response to receiving a command of copying data in a source address to a destination address, obtaining, at a first storage array, a first identifier associated with the source address and a second identifier associated with the destination address;
determining a first logical storage unit associated with the first identifier and a second logical storage unit associated with the second identifier, one of the first and second logical units being located in a second storage array outside the first storage array; and
copying, based on a Small Computer System Interface (SCSI) command, the data in the source address of the first logical storage unit to the destination address of the second logical storage unit,
the first and second identifiers being globally unique at least for the first storage array.

16. The device of claim 15, wherein the first logical storage unit is located in the second storage array, wherein determining the first logical storage unit associated with the first identifier comprises:
querying a logical storage unit list of at least one external storage array associated with the first storage array;
obtaining identifiers associated with logical storage units in the logical storage unit list; and
determining, from the logical storage list, the first logical storage unit associated with the first identifier.

17. The device of claim 16, wherein copying the data in the source address to the destination address comprises:
reading, through a SCSI command, the data in the source address from a first logical storage unit; and
writing the data into the destination address in a second logical storage unit.

18. The device of claim 15, wherein the second logical storage unit is located in the second storage array, wherein determining the second logical storage unit associated with in the second identifier comprises:
querying a logical storage unit list of at least one external storage array associated with the first storage array;
obtaining identifiers associated with logical storage units in the logical storage unit; and
determining, from the logical storage unit list, the second logical storage unit associated with the second identifier.

19. The device of claim 18, wherein copying data in the source address to the destination address comprises:
reading the data in the source address from the first logical storage unit; and
writing, through a SCSI command, the data into the destination address in the second logical storage unit.

20. The device of claim 15, the acts further comprising:
establishing, based on preconfigured login information, a connection with the second storage array.

21. A computer program product having a non-transitory computer readable medium which stores a set of instructions to copy data; the set of instructions, when carried out by computerized circuitry, causing the computerized circuitry to perform a method of:
in response to receiving a request for copying data in a source address to a destination address, sending a first query and a second query to a first storage array associated with the source address and a second storage array associated with the destination address;
receiving, from the first storage array, a first identifier as a response to the first query, the first identifier indicating a first logical storage unit in the first storage array corresponding to the source address;
receiving, from the second storage array, a second identifier as a response to the second query, the second identifier indicating a second logical storage unit in the second storage array corresponding to the destination address; and
triggering, based on the first and second identifiers, a storage array in the first and second storage arrays supporting inter-array data copy to perform copying the data,
the first and second identifiers being globally unique at least for the storage array being triggered.

22. A computer program product having a non-transitory computer readable medium which stores a set of instructions to copy data; the set of instructions, when carried out by computerized circuitry, causing the computerized circuitry to perform a method of:
in response to receiving a command of copying data in a source address to a destination address, obtaining, at a first storage array, a first identifier associated with the source address and a second identifier associated with the destination address;
determining a first logical storage unit associated with the first identifier and a second logical storage unit associated with the second identifier, one of the first and second logical units being located in a second storage array outside the first storage array; and
copying, based on a small computer system interface (SCSI) command, the data in the source address of the first logical storage unit to the destination address of the second logical storage unit, the first and second identifiers being globally unique at least for the first storage array.

\* \* \* \* \*